United States Patent [19]

Herek

[11] 3,826,034

[45] July 30, 1974

[54] FISHING HOOK ASSEMBLY

[76] Inventor: Edward W. Herek, 12030 1/2 Magnolia Blvd., Los Angeles, Calif. 91600

[22] Filed: July 23, 1973

[21] Appl. No.: 381,732

[52] U.S. Cl. .............................. 43/44.83, 403/361
[51] Int. Cl. .......................................... A01k 91/04
[58] Field of Search .................... 43/44.83; 285/239; 403/361

[56] References Cited
UNITED STATES PATENTS

| 589,216 | 8/1897 | McKee | 285/239 |
|---|---|---|---|
| 2,533,418 | 12/1950 | Benoit | 43/44.83 |
| 2,992,507 | 7/1961 | Gray | 43/44.83 X |
| 3,722,130 | 3/1973 | Handl | 43/44.98 |

Primary Examiner—Robert Peshock
Assistant Examiner—Daniel J. Leach
Attorney, Agent, or Firm—Roger A. Marrs

[57] ABSTRACT

A fishing hook assembly including a hook having a straight stem or shank having a barb on the curved end thereof and a plurality of barbs carried on the shank which downwardly extend in fixed spaced apart parallel relationship. The assembly further includes an elongated, flexible sleeve having an internal bore for insertably receiving the barbed shank of the hook via an open end of the sleeve. The opposite end of the sleeve incorporates an eye to which the end of the fishing line may be tied. The barbs embed themselves into the wall of the sleeve for retention between the sleeve and the hook.

6 Claims, 6 Drawing Figures

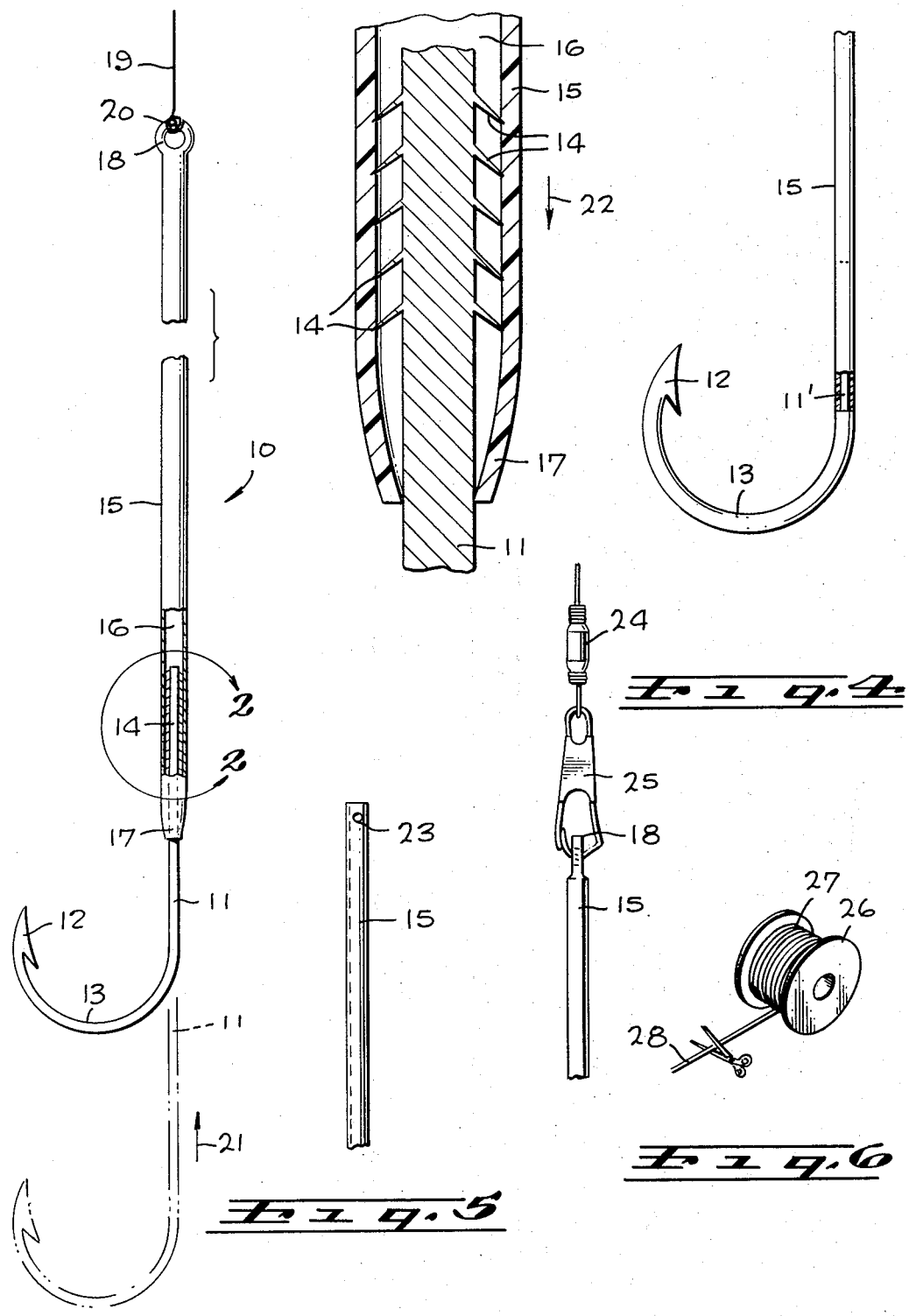

FISHING HOOK ASSEMBLY

BACKGROUND OF THE INVENTION

1. Field of the Invention

This invention relates to fishing hook attachment devices and, more particularly to a novel attachment device having a barbed shanked hook forceably urged into the central bore of a sleeve so that the barbs penetrate the wall of the sleeve in retaining and engaging relationship.

2. Description of the Prior Art

In the past, it has been a conventional practice to tie the end of a fishing line directly to an eyelet provided on the end of a fishing hook so that the hook is integral with the line. Additionally, it is sometimes useful to use a leader which is interconnected between the hook and the line. In either of these instances, it is the conventional practice to tie a knot in order to effect securement between the respective parts. Problems and difficulties have been encountered when knots are used since they sometimes slip and come undone and a finished knot provides a distinctive irregularity in the surface which may adversely detract fish.

Perhaps the most annoying problem is the actual tieing of the knot in which the rather small and barbed hook must be held while two hands are employed to tie the knot. Even after the knot has been tied, one end of the knot usually protrudes or projects out of symmetry with the assembly.

Some attempts have been made to employ an interconnection between lines, leaders and hooks so as to avoid the tieing of knots. Some of these attempts are shown in U.S. Letters Pat. Nos. 3,392,476; 2,992,507 and 2,884,733. Although these devices appear to eliminate the necessity for a knot, other problems are sometimes encountered such as the provision of a projection or hook that is intended to be registered with an opening in a sleeve. This arrangement requires precision alignment on behalf of the user and oftentimes slips once alignment and attachment have been made. Furthermore, in other instances a plastic sleeve is used which is shrunk through use of chemical treatment to the sleeve composition after it has been installed over the shank of a hook. This, of course, is time consuming and again requires additional supplies such as the shrinking chemical.

Therefore, there has been a long standing need to provide an attachment assembly for connecting fishing hooks, swivels, leaders or the like to one another without tieing the knot or involving precision alignment of mated components.

SUMMARY OF THE INVENTION

Accordingly, the above problems and difficulties have been obviated by the present invention which provides a novel fishing accessory attachment assembly which includes an elongated, rigid shank carried on a fishing accessory such as a hook that is provided with a plurality of spaced apart barbs angularly projecting outward from the central axis of the shank. The attachment assembly further includes an elongated sleeve of resilient material having at least one open end leading into its central bore into which the barb shank of the accessory is insertably received. The angular displacement of the barbs permit insertion in one direction only whereas movement in the opposite direction between the sleeve and the barbed shank causes the barbs to embed themselves into the material of the sleeve.

The sleeve may function as a leader or as an immediate attachment of the line to the hook. Although a hook will be described herein, it is understood that other accessories such as swivels, lures or the like are contemplated as well.

Therefore, it is among the primary objects of the present invention to provide a novel fishing accessory attachment assembly that is relatively smooth and free of undesired protrusions and irregularities.

Another object of the present invention is to provide a novel fishing hook attachment assembly that may readily assembled by unskilled persons in a convenient and rapid manner.

Still another object of the present invention is to provide a novel attachment assembly for fishing lines and hooks whereby attachment may be made by embedding a plurality of barbs into the material of a leader.

Still a further object of the present invention is to provide a novel attachment assembly for leaders, swivels and fishing hooks that is inexpensive to manufacture, easy to use and avoids registry of precision mated components as well as the necessity for tieing knots.

The features of the present invention which are believed to be novel are set forth with particularlity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a side elevational view, partly in section, of the novel fish hook assembly of the present invention;

FIG. 2 is an enlarged transverse sectional view of the retaining engagement between barbs and sleeve as taken in the direction of arrows 2—2 of FIG. 1;

FIG. 3 is a side elevational view of a modified version of the present invention illustrating a reduced diameter shank;

FIG. 4 is another modification of the invention used in connection with a conventional swivel;

FIG. 5 is a side elevational view of a sleeve having a hole at one end for securement purposes instead of the eyelet shown in FIG. 1; and FIG. 6 is a perspective view of a reel containing a roll of sleeve material and illustrating a predetermined length being severed from the roll.

DESCRIPTION OF THE PREFERRED EMBODIMENT

Referring to FIG. 1, the novel attachment assembly of the present invention is illustrated in the general direction of arrow 10 which includes a fishing implement or device such as a hook comprising a straight stem or shank 11 having a barbed hook 12 formed on the end of an arcuate portion 13. Along the external surface of the stem or shank 11, there is provided a plurality of barbs such as is indicated by the numeral 14. These barbs are arranged in close proximity to the end of the fishing hook opposite to its end carrying the arcuate portion 13. It is to be particularly noted that the end of the stem or shank 11 does not have the usual integral eye or eyelet normally used to tie a knot with the leader or fishing line.

The attachment assembly 10 further includes an elongated sleeve 15 having a central bore 16 open at its end indicated by numeral 17. The opposite end of sleeve 16 from its open end 17, includes an integrally formed eyelet 18 for receiving the end of a fishing line 19 with a knot 20. It is to be understood that the eyelet 18 and the knot 20 are located a substantial distance away from the hook so that the presence of the knot or eyelet at this location is not objectional. The sleeve is preferably composed of a plastic or plastic like material which is relatively resilient and flexible.

The barbed stem or shank of the fishing hook is inserted through the open end 17 in the direction of arrow 21 in order to effect attachment. The hook is illustrated in broken lines preparatory for inserting the barbed shank 11 into the bore 16 of sleeve 15. As illustrated in solid lines, the hook is firmly attached to the sleeve 15.

Referring now in detail to FIG. 2, it can be seen that the plurality of barbs 14 are downwardly depending toward the hook end of the hook so that the shank 11 may be introduced through the open end 17 of sleeve 15 in one direction. However, when the direction is slightly reversed such as indicated by arrow 22, engagement of the pointed barbs with the wall of the sleeve 15 is effected. Preferably, the length of the individual barbs is less than the distance from the surface of the hook shank to the outer surface of the sleeve 15 so that the sleeve will not tear and the barbs will not protrude through the full thickness of the wall. Also, it is to be noted that end 17 slightly tapers due to the self bias of the resilient material employed in the composition of the sleeve. Preferably, some form of plastic is employed which has a slight memory so as to snugly fit over the shank 11. However, it is to be particularly noted that a shrinking or reducing agent is not needed for constricting sleeve 15.

Referring now in detail to FIG. 3 a modification of shank 11 is illustrated in which the shank is of reduced diameter and indicated by numeral 11'. The diameter is reduced over that of the arcuate portion 13 so that the thickness of the walls of sleeve 15 will make up the difference of the reduction. This will permit a smooth and co-extensive exterior relationship to exist between sleeve 15 and the junction with the arcuate portion 13 of the hook. As previously described, the plurality of barbs 14 are included on the reduced shank 11'.

Referring now to FIG. 5, it can be seen that sleeve 15 may be modified to incorporate a hole or opening 23 at its end normally formed with eyelet 18. Therefore, it can be seen that the eyelet need not be employed in all instances and that it is only necessary to provide an aperture or opening for insertion of the line therethrough to effect mated attachment therewith. Also, it is to be noted in FIG. 4 that other fishing accessories may be employed than a fishing hook or line. For example, a conventional swivel 24 may be employed in which a usual double ended snap connector 25 coupled between the swivel and the eyelet.

The sleeve 15 may be stored on a reel 26 as shown in FIG. 6 in the form of a roll 27. When it is desired to use the sleeve, a length 28 may be measured and pulled from the roll 27. The predetermined length 28 may then be cut from the roll and used.

In view of the foregoing, it can be seen that a novel attachment assembly is provided for connecting the end of a hook or the like to a fishing line. By inserting the barbed shank of the hook into the bore of the sleeve and then pulling the sleeve and the hook in opposite directions, the barbs will embed themselves in the material of the sleeve wall and form a connection therewith. Not only is the attachment made simply and conveniently, but the hook may be readily removed from the mouth of the fish by cutting the sleeve above the shank of the hook and pulling the smooth shank through the fishes lip or mouth. The device is economical to manufacture and may be readily stored in the form of a roll 27 with respect to the sleeve material.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an attachment assembly for interconnecting a fishing line with a fishing hook, the combination comprising:

an elongated shank carried on said hook;

a plurality of barbs arranged in fixed spaced relationship outwardly projecting from said hook shank;

an elongated sleeve composed of resilient material and having a central bore with at least one end open to insertably receive said barbed shank; and the length of each of said barbs being shorter than the distance from the surface of said hook shank to the outer surface of said sleeve;

said barbs project in the direction of said hook so that insertion of said shank is permitted with said sleeve but withdrawal is prevented by engagement of said barbs with said sleeve;

the end of said sleeve opposite to its end having an opening into said bore is provided with an integral eyelet for connection with the end of said fishing line;

said sleeve end surrounding said opening to said bore is resilient and self biasing to normally contract about said barbed shank.

2. The invention as defined in claim 1 wherein: said shank has a reduced diameter from the diameter of said hook.

3. The invention as defined in claim 2 wherein: said sleeve is of predetermined length and severed from a storage roll.

4. The invention as defined in claim 3 wherein: said barbs are provided in a plurality of rows and columns and are close to the body of said shank.

5. In an attachment assembly for coupling a fishing line with a fishing hook, the combination comprising:

an elongated shank carried on said hook;

a plurality of barbs arranged in fixed spaced apart relationship outwardly projecting from said hook shank in the general direction of said hook;

said barbs being angularly disposed with respect to said shank so as to project at an acute angle with respect to said shank;

an elongated pliable sleeve composed of resilient material and having a central bore terminating at one end in a reduced opening for insertably receiving said barbed shank whereby the direction of said barbs permits insertion of said shank into said sleeve bore but withdrawal is prevented by engagement of said barbs with said sleeve; and the length of each of said barbs being shorter than the distance from the surface of said hook shank to the exterior surface of said sleeve.

6. The invention as defined in claim 5 wherein said sleeve end surrounding said reduced opening to said bore is resilient and self biasing to normally contract about said barbed shank.

* * * * *